United States Patent [19]

Wozencraft

[11] 3,896,381

[45] July 22, 1975

[54] RELIABLE RADIO-TELETYPE CODING

[75] Inventor: John M. Wozencraft, Boston, Mass.

[73] Assignee: The United States of America as represented by the Secretary of the Army, Washington, D.C.

[22] Filed: Nov. 2, 1960

[21] Appl. No.: 66,886

[52] U.S. Cl. .................... 325/32; 325/30; 325/65

[51] Int. Cl. .................... H04b 15/00

[58] Field of Search ..... 340/147 A, 146.1; 178/256, 178/23.1; 235/153; 250/6.6, 8.30; 325/32-34, 30, 65, 473, 304

[56] References Cited

UNITED STATES PATENTS

| | | | |
|---|---|---|---|
| 2,968,718 | 1/1961 | McKesson | 325/304 |
| 2,975,404 | 3/1961 | Kups | 340/146.1 |

*Primary Examiner*—Richard A. Farley
*Attorney, Agent, or Firm*—Nathan Edelberg; Robert P. Gibson; Jeremiah G. Murray

EXEMPLARY CLAIM

1. A communications system for transmitting teletype information comprising: a magnetic tape player having a multi-channel output, a program generator for developing timing pulses having a plurality of outputs and controlled by one of said output channels of said magnetic tape player in which control information has been pre-recorded, a teletype tape reader controlled by timing pulses from said program generator, a multiple stage shift register connected to the output of said tape reader for temporarily storing data received from said tape reader, said shift register being controlled by timing pulses from said program generator to commutate said data into binary code trains of time-sequential pulses, a parity counting circuit for receiving said time-sequential pulse trains and adding an appropriate parity checking pulse to each of said trains, a switch modulator having first and second outputs controlled by said time-sequential pulses and said parity checking pulses, first and second gates connected to first and second tone channels, respectively, of said magnetic tape player, said first and second gates being enabled by said first and second outputs, respectively, of said switch modulator, the tones passed by one of said gates being chosen to represent a "mark" and the tones passed by the other of said gates being chosen to represent a "space" in said binary code to thereby represent said train of pulses as a sequence of tones, and means for transmitting said sequence of tones.

9 Claims, 6 Drawing Figures

PATENTED JUL 22 1975 3,896,381

SHEET 1

*INVENTOR.*
JOHN M. WOZENCRAFT
BY Jack H. Linscott

INVENTOR.
JOHN M. WOZENCRAFT
BY Jack H. Linscott

INVENTOR.
JOHN M. WOZENCRAFT
BY Jack H. Linscott
ATTORNEY

INVENTOR.
JOHN M. WOZENCRAFT
BY Jack H. Linscott
ATTORNEY

RELIABLE RADIO-TELETYPE CODING

The invention described herein may be manufactured and used by or for the Government for governmental purposes, without the payment of any royalty thereon.

This invention relates to radio-teletype coding systems and more particularly to a reliable radio-teletype coding system for transmitting and receiving radio-teletype messages in the presence of enemy jamming with little error.

Prior to this invention, radio-teletype equipment suitable for use in tactical applications was vulnerable to enemy jamming when the Jamming-to-Signal (J/S) ratio exceeded approximately -6db. A considerable amount of effort has been spent on developing systems for strategic nets which will be far less vulnerable to jamming, but because of size, weight, and complexity, these strategic equipments are unsuitable for tactical applications.

Accordingly, it is a primary object of this invention to provide an improved tactical radio-teletype coding system for reliable operation in the presence of jamming.

Another object of the invention is to provide improved methods and apparatus for the security transmission of information.

A more specific object of this invention is to provide a redundant radio-teletype coding system utilizing an iterated parity checking procedure whereby interference rejection is significantly increased.

Another more specific object is to provide a radio-teletype system having an error rate of less than one error per twenty lines of teletype copy for a Jamming-to-Signal (J/S) ratio of +10db.

In accordance with the above, the invention may be illustrated in connection with a coder which transmits a teletype character as a sequence of 12 bauds of binary (two-valued) signals organized to represent six elements, commonly designated as mark or space, each element identified by two bauds. The second baud of each element provides a redundant indication, which may be considered from another viewpoint as a very elementary but certain parity check for that element; furthermore, only five of the elements are required for the usual teletype operation and the sixth element provides a parity check on the entire character in the more usual manner, indicating an error when the six code elements of a character fail to correspond to the prearranged parity.

In addition to this redundancy and parity check to recognize and overcome the effect of jamming the signals during each baud are transmitted according to a predetermined code within the bandwidth available. In simple form this code may involve merely sequential pseudo-randomly selected different pairs of frequencies within each baud, either one of which is selected according to whether a mark or space is to be transmitted. A particular frequency may correspond to mark or space in different bauds depending only on the pseudo-random selection. This pseudo-random selection is not essential to analyze operation, except that otherwise jamming probably would not be limited to particular bauds. A receiver is synchronized with the transmitter and so constructed that it will pass signals of each of the predetermined random frequencies only during the time intervals established in accordance with the above-mentioned code. Summarizing, in each baud one of two particular frequencies represents mark or space, each baud repeated (on different frequencies) to provide a parity check on mark or space data of each element, and information elements of entire character have a further such element to provide a parity check on the entire character; this merely provides an illustrative setting for the invention.

In this general field of communication a properly synchronized receiver detector integrates over each baud to provide an output dependent (except for noise and fading) on the matching of the transmitter and receiver frequencies as noted in Applicant's prior U.S. Pat. No. 2,880,316. Also, as shown by Price and Green U.S. Pat. No. 2.982,853 complex functions may be used instead of simple frequencies if synchronized even more precisely. Actually separate detectors are first used for each of signals conveniently designated as mark and space, and presumably true mark or space signal is identified in the usual manner in a comparator or difference detector by determining which output is greater. At moderate noise levels this comparison is enough to minimize errors. However, in case of jamming, output from a false signal may often exceed that from the true signal, a condition corrected by the present invention. The rare case of a false signal actually cancelling a true signal by reverse phase components of equal magnitude is not corrected.

The greater overall output (mark or space and due to true signal or jamming) in each baud is herein called dominant and the lesser such output non-dominant. Ordinarily the dominant output for both successive bauds of an element would identify the same (mark or space) signal. In the event that the enemy succeeds in jamming one baud of an element, the identified signals would differ; a logic circuit in the receiver therefore distinguishes between the jammed and unjammed bauds of each element to identify the signal from the unjammed baud. In particular, the non-dominant outputs of the two successive bauds are compared, and the greater, herein called larger, identifies the actual signal to a high degree of reliability. The terms dominant and larger are used merely to distinguish the usual comparison involving the two simultaneous outputs in each baud, one called dominant and one non-dominant, from a second comparison involving only the non-dominant outputs in two or more successive bauds, one called larger and the smaller merely ignored and not referred to again. Previously such a parity check correction was commonly based on the weakest comparator output, a less reliable correction, particularly under jamming conditions, than the largest of the non-dominant signals. In the event that the enemy succeeds in jamming both bauds of only one element of the character a somewhat similar parity check on the character as a whole is used to identify the correct signal for that element. It will be apparent that the effect of jamming is overcome by the present invention unless an enemy, without clear knowledge of the receiver location, supplies at the receiver sufficient jamming energy corresponding to the random frequencies to jam both bauds of more than one element.

Further objects and features of the invention will become apparent upon consideration of the following detailed description taken in conjunction with the drawing in which.

Figure 1:
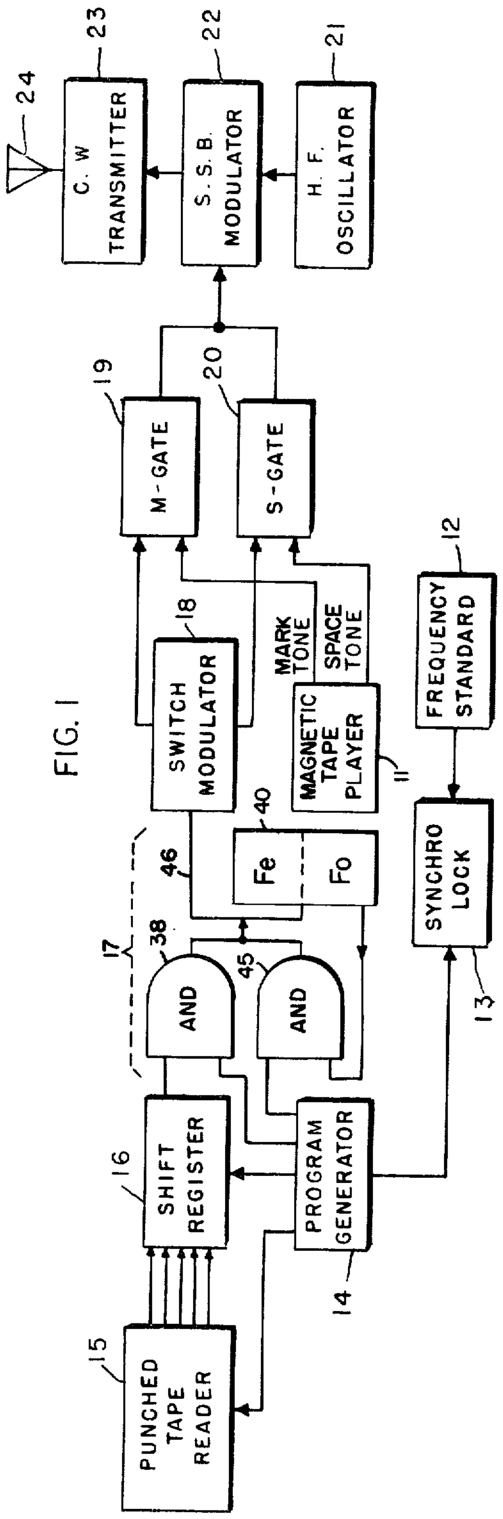
FIG. 1 is a block diagram of a transmitter circuit in accordance with the invention.

Referring now to the drawings, there is shown in FIG. 1 a transmitter circuit, according to the present invention, which includes a magnetic tape player 11 the speed of which is controlled by a stable frequency standard 12 by means of phase comparison of the output of frequency standard 12 with a signal from a program generator 14 in a synchro-lock circuit 13, the output of which is supplied as a control signal to regulate the speed of tape player 11.

Program generator 14 provides various series of pulses for timing of bauds, elements, and full characters, two bauds for each element, one parity and five ordinary code elements for each character. Since element pulses and similar inter-element pulses are required in the system as will appear later, if the inter-element pulses are spaced half way between the element pulses the two series may be merely combined to provide the baud pulses. Similarly every sixth element pulse may be selected as a character pulse. Slight delays from this elementary timing are required to assure proper sequence of operations as pointed out in greater detail below.

A punched tape reader 15 is provided which accepts five-baud punched teletypewriter information tape, and reads out on a five-wire basis at a rate determined by character timing pulses from program generator 14. The output from punched tape reader 15 is temporarily stored in a five-stage shift register 16 which is read out on a sequential basis in response to element timing pulses supplied from program generator 14 to supply five-baud binary trains of time sequential d.c. pulses to parity circuit 17, including the AND gate portion 38 to pass the shift register outputs at the proper times to the modulator 18 and to the actual odd-even counting flip-flop portion 40 controlling AND gate portion 45 to add a parity check pulse from program generator 14 in the sixth baud of each character to make the count even if not already even. The bauds here mentioned correspond to code elements of a character (or an extra parity checking element for the character); this should be distinguished from the actual bauds transmitted to the remote station as later described, twice as many transmitted bauds being used, to send each element baud in duplicate so that most jamming errors may be overcome. It will be recognized that binary pulse bauds may be actual pulses of different properties, or more commonly pulses and absence of pulses. The term pulses, as commonly used to designate any of these alternatives, is so used herein unless otherwise indicated.

The trains of six binary pulses thus formed are then fed to a switch modulator 18, one output of which represents a "mark" in the binary code and the other output of which represents a "space." The "mark" output of switch modulator 18 is utilized as an enabling signal for gate 19 to allow that gate to pass random frequency tones from the "mark" tone track of tape player 11, the details of which will be described hereinafter. In a similar manner the "space" output of switch modulator 18 is utilized as an enabling signal for gate 20 to allow that gate to pass random frequency signals from the "space" tone track of tape player 11. Thus the punched tape pulse no-pulse signals have now been converted to represent mark and space each by actual signals.

The outputs of gates 19 and 20 are fed to a single sideband modulator 22 where the signal is heterodyned to the final transmitted radio-frequency by a stable high frequency oscillator 21. The resulting signal is then supplied to a continuous wave transmitter 23, fed to an antenna 24, and radiated.

The frequencies used for the random tone sequences in the "mark" and "space" tone tracks are chosen from those available within the limitations of the allowable bandwidth of the system and the duration or length of each transmitted pulse or baud. The number of frequencies from which to choose is equal to the product TW, where T is the duration of each baud in seconds and W is the bandwidth in cycles per second.

Figure 2:
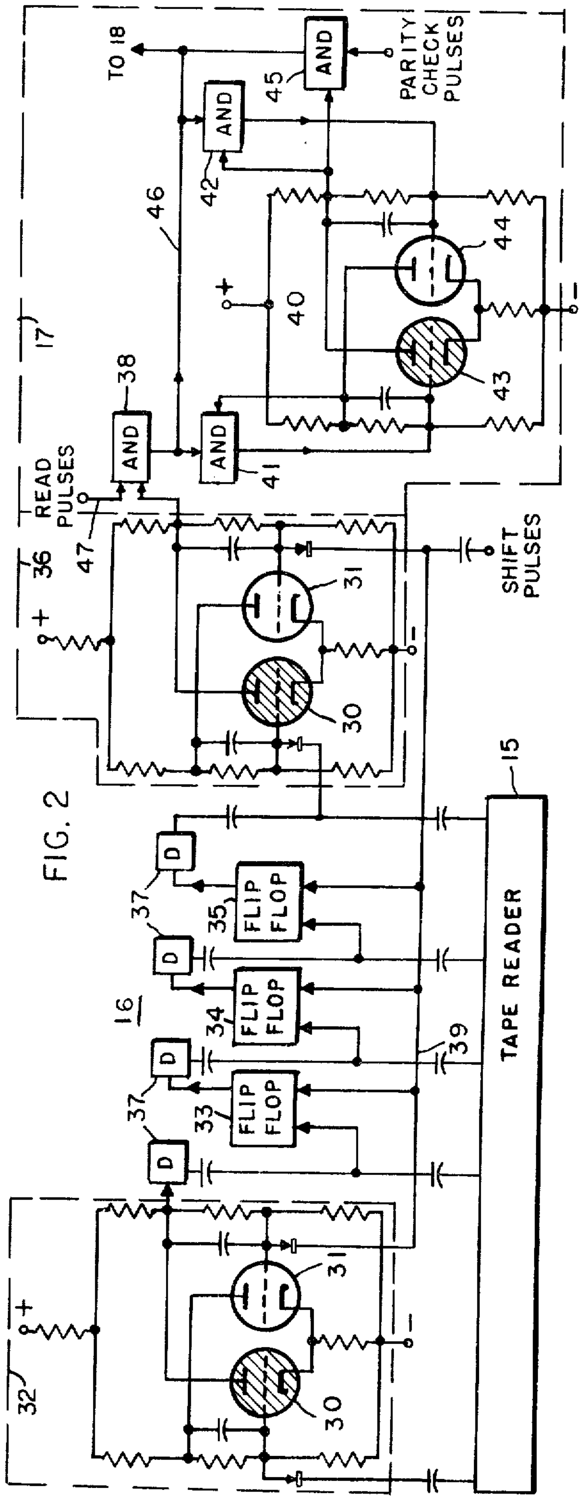
FIG. 2 shows details of a portion of the transmitter circuit of FIG. 1.

The operation of the circuit of FIG. 1 will be described in conjunction with the circuit of FIG.2 which shows details of shift register 16 and parity counter 17.

Two tone tracks containing the random frequency tones supplied to gates 19 and 20 are recorded in advance on a magnetic tape according to a predetermined random sequence for each tone track. In addition, a separate control track is recorded on the tape and is used to synchronize the operation of program generator 14 with tape player 11. When a tape containing the above information is played in tape player 11, a signal is supplied from the control track to program generator 14 by means of line 25 to synchronize the timing pulses developed therein with the transitions between the random tones sent to gates 19 and 20. A feedback signal from program generator 14 is compared in synchro lock 13 with the signal from stable frequency source 12 to form a resultant control signal used to regulate the speed of tape player 11.

Each line of information in punched tape reader 15, which is a conventional five-baud punched teletypewriter tape reader, is read on a five wire basis in response to a character timing pulse from program generator 14 and supplied to shift register 16. For the purpose of this discussion it is assumed that a mark on the punched tape is read as a negative on pulse and that a space will be designated by the absence of any signal or an off pulse. The five bauds in a line read by punched tape reader 15 are read simultaneously and are applied to shift register 16 to fill all the stages simultaneously. Each stage of shift register 16 comprises a conventional static flip-flop circuit having a pair of tubes 30 and 31 as the active elements. Five flip-flop circuits 32 through 36 are provided, with the first output or baud from punched tape reader 15 being supplied to the grid of tube 30 in flip-flop 36, the second output from punched tape reader 15 being supplied to flip-flop 35, and so on with the fifth output from punched tape reader 15 being supplied to the grid of tube 30 in flip-flop 32. Prior to the receipt of input pulses from tape reader 15, each stage 32 to 36 of shift register 16 is set to "space" which results in the condition where tubes 30 are conducting and tubes 31 are held non-conducting. When the output from tape reader 15 is applied to shift register 16, each line carrying a mark pulse will cause a negative pulse to be applied to the grid of tube 30 of its respective flip-flop thereby turning tube 30 off. As a result the plate voltage of tube 30 will rise, turning on tube 31 which will then hold tube 30 off thus setting the flip-flop in its mark state. The lines from punched tape reader 15 which designate a space on the punched tape will have no signal on them and the flip-flop circuits of shift register 16 connected to these lines will remain in the original space state. It is to be noted that when flip-flops 32 to 36 are in their mark state, tube 30 is non-conducting and has a high plate voltage as a result; and when flip-flops 32 to 36 are in their space state tube 30 is conducting and its plate voltage is low. Thus the mark state of each flip-flop 32 to 36 corresponds to a high positive voltage at the plate of tube 30 but the actual mark output of interest is the negative pulse which occurs when this voltage drops due to the negative reset pulse applied to the grid of tube 31. Thus the tape reader mark output to the particular flip-flop or such output from a prior flip-flop momentarily stored, and upon reset the mark output of each of flip-flops 32 through 35 is connected to the grid of tube 30 in the next succeeding flip-flop through a delay line 37 while the mark positive state of flip flop 36, rather than the following negative pulse, is used as an input to gate 38.

Gate 38 is designed so that a read pulse on line 47 will be passed on to parity counter 17 as a negative pulse only if the gating input from flip-flop 36 is high signifying a mark stored in that flip-flop. In this case a mark output from gate 38 occurs at the read pulse during the mark state of flip-flop 36, rather than at the shift pulse ending such mark state as in flip-flops 32 to 35. After the information from punched tape reader 15 has been stored in shift register 16, a first read pulse from program generator 14 is applied to the input of gate 38. If the corresponding input from flip-flop 36 is high, designating a mark stored therein, gate 38 will be enabled and a pulse will appear at its output. If the corresponding input from flip-flop 36 is low, designating a space stored therein, gate 38 will not be enabled and will remain off. It can be seen, therefore, that the output of gate 38 will be a series of on and off pulses designating mark and "space" respectively, actually "pulse" and "no-pulse" outputs.

After the information originally stored in flip-flop 36 has been "read", a negative shift pulse from program generator 14 is applied simultaneously to the grid of tube 31 in all flip-flops 32 through 36 by means of line 39 to drive all the flip-flops momentarily to state space. The coupling between the flip-flops is such that a succeeding flip-flop will respond to a signal from a preceding flip-flop only if the preceding flip-flop goes from state mark to state space which causes the voltage at the anode of tube 30 to drop from a high value to a low value. The resultant negative pulse is applied to the grid of tube 30 in the succeeding flip-flop and will drive it to stage mark. The delay sections 37 have a delay considerably smaller than the interval between successive shift pulses and are required to prevent a particular flip-flop from receiving both reset and set pulses simultaneously from shift line 39 and from a preceding flip-flop.

It is evident that the application of a shift pulse causes the information stored in flip-flops 32 to 36 to be advanced one stage to the next succeeding flip-flop, i.e., the information formerly stored in flip-flop 35 is now stored in flip-flop 36, that of flip-flop 34 in flip-flop 35, and so on. Another read pulse is then applied to gate 38 followed by another shift pulse on line 39. This sequence continues until five read pulses, each followed by a shift pulse on line 39, have been applied to gate 38. This results in a sequential train of binary pulses or bauds from the output of gate 38 which represent the original five bauds obtained from tape reader 15. The fifth shift pulse applied to shift register 16 clears the register, i.e., all stages will be in the space state and the next line of information from tape reader is then supplied to shift register 16 and the sequence is repeated. The timing must be such that after reading tape into register the state of its last stage is read before each of 5 shifts; then register is empty and sixth reading would produce no output but this time is available for parity check pulse. New reading of tape must then occur before the next reading of register.

The on and off pulses from gate 38 representing mark and "space", respectively, in the original teletype information are applied in parallel to parity counter 17 and switch modulator 18.

Figure 4A:
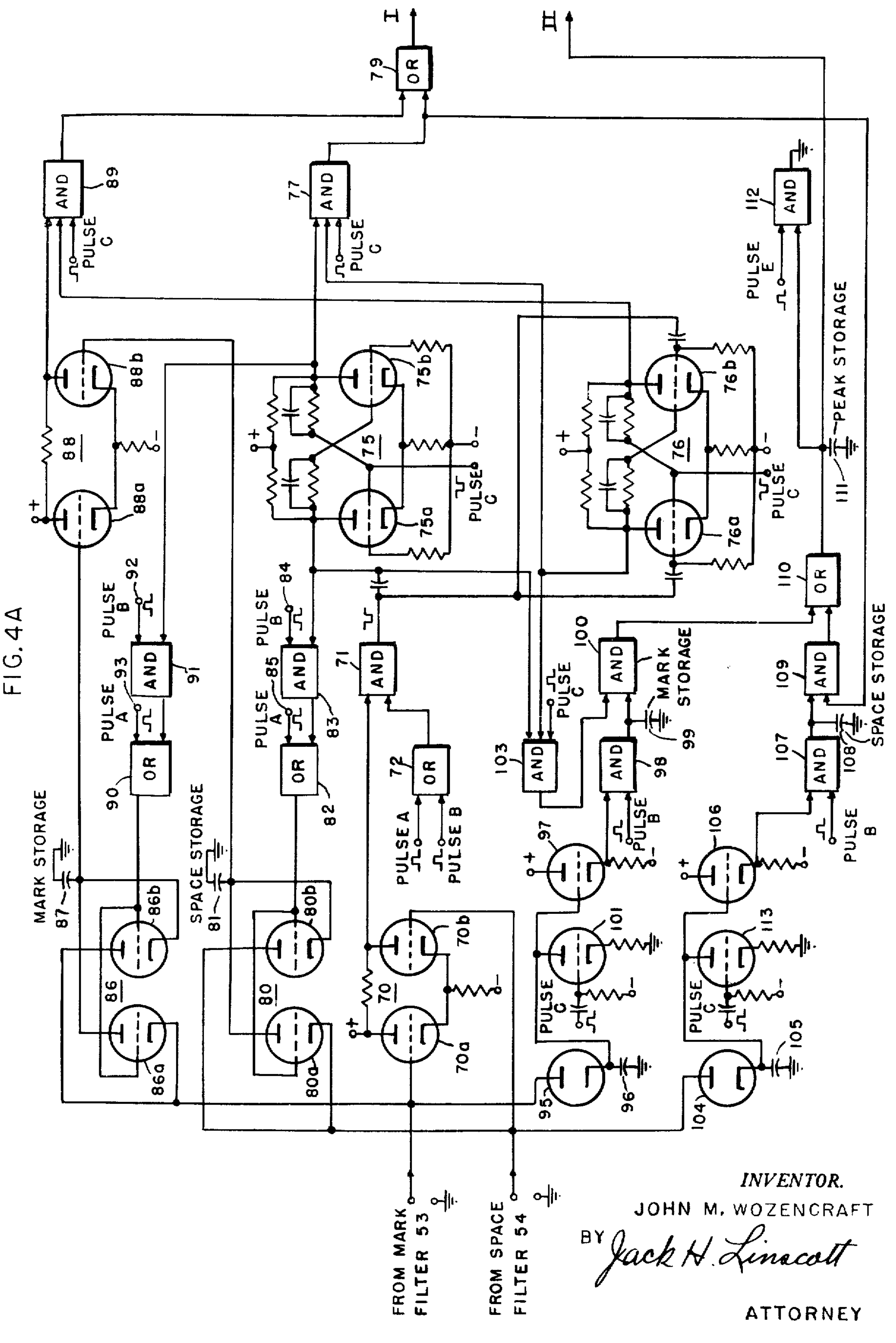
FIG. 4 shows details of a portion of the receiving circuit of FIG. 3.

Parity counter 17 is a simple binary counter comprising a static or bi-stable flip-flop circuit 40 and gates 41 and 42. For reasons to appear later tube 44 will be non-conductive at the beginning of each character. The particular form of counter shown involves gating circuits 41 and 42 for the triggering pulses from gate 38, but a simpler counter 76 is illustrated in the receiver of FIG. 4A. Gate 41 receives a high gating voltage when tube 44 is non-conducting and gate 42 receives a high gating voltage when tube 43 is non-conducting since the plate voltage of the non-conducting tube is high and the gating voltages to gates 41 and 42 are taken from the plates of tubes 44 and 43 respectively. Since tube 44 is initially non-conductive, gate 41 will pass the first on pulse from gate 38 and gate 42 will block this pulse. The output of gate 41 is applied to the grid of tube 43, turning it off. Tube 44 is then turned on and flip-flop 40 is in its second state with the gating voltage to gates 42 and 45 being high and that to gate 41 being low. The next on pulse from gate 38 will be passed by gate 42 and cause flip-flop 40 to switch to its original state. It can readily be seen that an odd number of on pulses from gate 38 will always result in flip-flop 40 being set to its second state where a high gating voltage is applied to gates 42 and 45, and that an even number of on or mark pulses from gate 38 will result in flip-flop 40 being set to its first state where a low voltage is applied to gates 42 and 45. It is evident from the operation of parity counter 17 that off or space pulses from gate 38 will have no effect on the parity counter circuit 17. After five read pulses have been applied to gate 38, a parity check pulse from program generator 14 is applied to gate 45. If the number of mark or on pulses in the previous train of five pulses from gate 38 was odd, gate 45 will pass the parity check pulse and it will be added to the train of pulses sent to switch modulator 18 on line 46 as a mark pulse thereby making the number of marks in each sequence of six pulses even. If the number of mark or on pulses in the previous train of five pulses from gate 38 was already even, insufficient voltage will be applied to gate 45 from flip-flop 40 and the parity check pulse from program generator 14 will be blocked resulting in an off or space pulse being added to the train of pulses sent to switch modulator 18 on line 46 thereby making the number of marks in the train of six pulses remain even.

The parity check pulse passed by gate 45 will also be passed by gate 42 and applied in the form of a negative pulse to the grid of tube 44 to render tube 44 non-conducting thereby changing the state of flip-flop 40 to its original or even state ready to receive the next series of five pulses from gate 38. If the parity check pulse is blocked by gate 45, flip-flop 40 is already in its even state and does not need to be reset, so a separate reset pulse is not necessary; any pulse in the output also actuates flip-flop 40 thru gate 41 or 42, but a parity check pulse would only actuate it thru gate 42, never thru gate 41.

During the time that the parity check pulse is being added to the train of pulses from gate 38, no read pulse is applied to gate 38; and this interval is used to fill flip-flops 32 to 36 with the next line or set of binary information from tape reader 15. The above sequence is then repeated for the next five information bauds, and so on for the duration of the message to be transmitted.

The various timing pulses from program generator 14 are arranged so that the input train of pulses to switch modulator 18 is a continuous train of on and off pulses representing mark and space, respectively. The duration of each pulse or baud at the outputs of switch modulator 18 is 2T seconds where T is the duration in seconds of the final transmitted bauds.

Switch modulator 18 is a monostable multivibrator circuit having a pair of outputs. Mark or on pulses from gates 38 and 45 will cause switch modulator 18 to switch to its non-stable state for a duration of 2T seconds and cause an enabling signal to be supplied to mark gate 19, while space or off pulses from gates 38 and 45 allow switch modulator 18 to remain in its stable state, the output of which supplies an enabling signal to space gate 20. Thus either gate 19 or gate 20 is always enabled during the transmission of a message.

When mark gate 19 and space gate 20 are enabled by a gating input from switch modulator 18, they allow the random frequency tones from the corresponding outputs of tape player 11 to be passed to transmitter 23. Each pulse or baud from switch modulator 18 has a duration of 2T seconds, but the random frequency tones from tape player 11 change every T seconds thereby causing each original baud to be transmitted as a sequence of two bauds, each having a different frequency. Due to the action of program generator 14, the transitions between bauds from switch modulator 18 occur at the same instants as transitions in the recorded random tone sequences from tape player 11. Thus the five original information bauds plus the added parity check baud in each sequence are commutated into a sequence of twelve bauds, each represented by a random frequency tone. This signal is then fed to single sideband modulator 22, where it is heterodyned to the final transmitted r-f frequency by stable high-frequency oscillator 21. The resulting r-f signal is then amplified in continuous wave transmitter 23, fed to antenna 24, and radiated.

Figure 3:
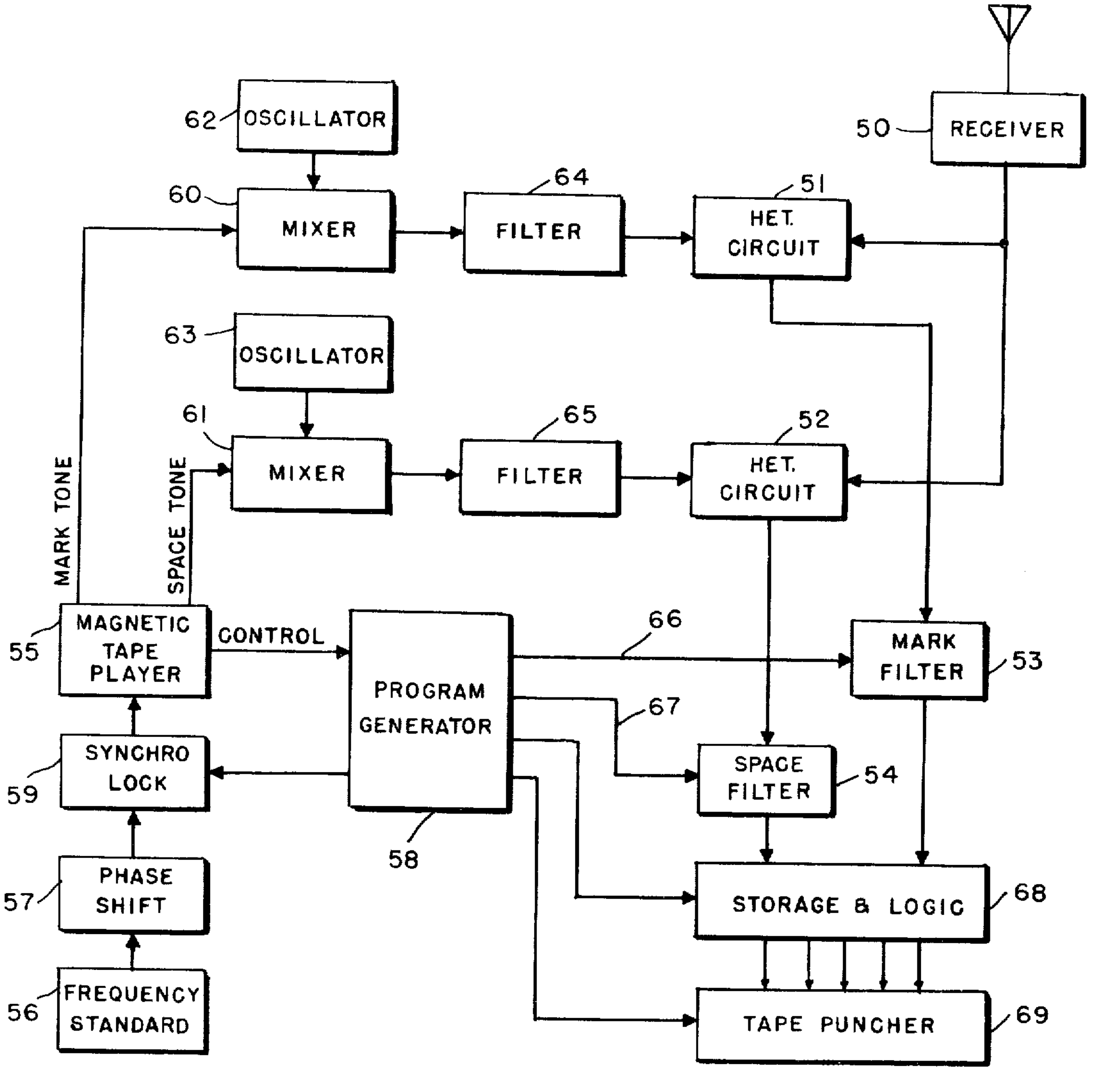
FIG. 3 is a block diagram of a receiving circuit adapted for use with the transmitter of FIG. 1.

FIG. 3 illustrates a receiver adapted to detect and reconstruct the original transmitted teletype information in spite of enemy jamming. The radiated signal from the transmitter of FIG. 1 is detected by any suitable stable receiver 50, the i.f. output of which is fed in parallel to two heterodyning circuits 51 and 52. The outputs of heterodyning circuits 51 and 52 are connected to mark and space filters 53 and 54, respectively, which are of the narrow band integrate and dump type described in J. M. Wozencraft U.S. Pat. No. 2,880,316. In order that mark and space filters 53 and 54 may be of a constant center frequency in spite of the variations in frequency of the received mark and space signals, the heterodyning signals for circuits 51 and 52 are generated from a magnetic tape and magnetic tape player 55 identical to the tape and tape player 11 used in the transmitter of FIG. 1. The speed of tape player 55 is controlled by a stable frequency standard 56, the output of which is fed through a suitable phase shifting circuit 57 in order that exact synchronism can be obtained between the magnetic tapes at the transmitter and receiver. This signal is then compared with a signal from program generator 58 in a suitable synchro-lock circuit 59 which supplies a control signal to tape player 55.

Tape player 55 has three output tone tracks or channels which are identical to those previously discussed in conjunction with tape player 11. A control channel is used to control the operation of program generator 58 so that the various timing pulses developed therein will be synchronized with the transitions in the random tone sequences supplied to mixers 60 and 61 by tape player 55. The mark tone sequences from tape player 55 are fed to mixer 60 and the "space" tone sequences are fed to mixer 61. Stable fixed-frequency oscillators 62 and 63 heterodyne the mark and "space" channel audio outputs of tape player 55 to the appropriate i.f. frequency in mixers 60 and 61, respectively. If mark and space filters 53 and 54 have the same center frequency, a single stable fixed-frequency oscillator can be used in place of oscillators 62 and 63.

The outputs of mixers 60 and 61 are filtered by band-pass i.f. filters 64 and 65 and are fed to heterodyning circuits 51 and 52, respectively. Heterodyning circuit 51 supplies the input signal for mark filter 53 and heterodyning circuit 52 supplies the input signal for space filter 54. The dumping signal for filters 53 and 54 is provided on lines 66 and 67 by program generator 58 at the end of each baud.

Storage and logic means 68 receives the signals from filters 53 and 54 and decodes these signals into the original teletype information. This information is supplied to tape puncher 69 which reproduces the original information on punched teletypewriter tape. Program generator 58 supplies stepping and sampling pulses to storage and logic means 68 and to tape puncher 69.

Figure 4B:
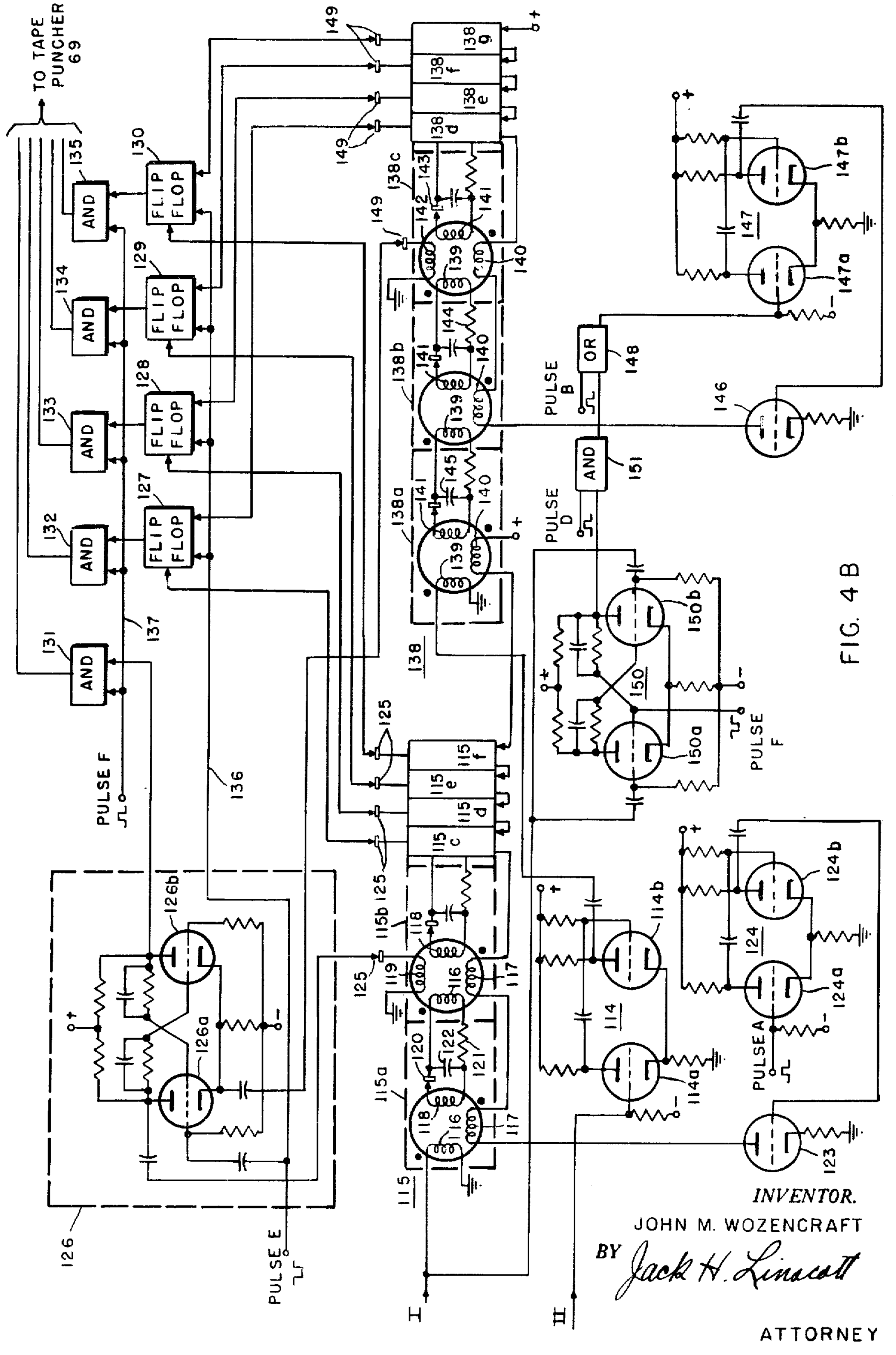

FIGS. 4A and 4B show storage and logic means 68 in detail. The output pulses from mark filter 53 are supplied in parallel to the grid of tube **70*a* of voltage comparator 70, to the cathode of tube 86*a* and the anode of tube 86*b* of bi-direction sampling gate 86, and to the anode of diode 95. In a similar manner, output pulses from space filter 54 are supplied in parallel to the grid of tube 70*b* of voltage comparator 70, to the cathode of tube 80*a* and the anode of tube 80*b* of bi-direction sampling gate 80, and to the anode of diode 104. The circuit 70 (also 88) has a dual function of comparing mark and space inputs thru the cathode circuit and lowering output voltage in anode circuit only when space signal predominates, to close AND gate 71** for a non-pulse space indication. The larger of these may be referred to as dominant and the smaller as non-dominant for convenient terminology, since further comparison between non-dominant pulses is required under certain conditions.

The anode of tube **70*b* of voltage comparator 70 is connected to AND gate 71 as one of two inputs therefor. The other input for gate 71 is supplied from OR gate 72 which passes pulses A and B from programa generator 58, both indicated jointly as Band Sync in FIG. 5. The output of gate 71** is connected to the plate of tube 75*a* of flip-flop 75 and is also connected symmetrically to the grids of tubes 76*a* and 76*b* of flip-flop 76. The anodes of tubes 75b and 76*a* are connected to AND gate 77 which also receives pulses from program generator 58 at time C (the relationship of the various timing pulses utilized in storage and logic circuit 68 will be more fully explained in the subsequent description of operation of the circuit of FIGS. 3 and 4 taken in conjunction with FIG. 5), and the output of gate 77 is connected to AND gate 109 and OR gate 79. An output from gate 77 will indicate an even mark decision, i.e., that both bauds of a received element are mark as will be explained in detail in the description of operation of the circuit.

When one of the two bauds comprising an element is jammed, another circuit, which is called the odd baud decision circuit for convenience, is utilized. This circuit comprises a pair of identical circuits, one connected to the output of mark filter 53 and the other connected to the output of space filter 54. The anode of tube 80*b* and the cathode of tube 80*a* of bi-direction sample gate 80 are connected to the output of space filter 54, a space storage capacitor 81 has one terminal connected to ground and its other terminal connected to the anode of tube 80*a*, to the cathode of tube 80b, and to the grid of tube 88*b* of a conventional voltage comparator 88. The grid potential for both tubes 80*a* and 80*b* of bi-direction gate 80 is supplied by pulses from OR gate 82 which is connected to the output of AND gate 83 and also receives A pulses from program generator 58. The gating voltage for gate 83 is obtained by connecting the anode of tube 75*a* of flip-flop 75 to gate 83 which also receives B pulses from program generator 58 thereby completing the space circuit or channel of the odd baud decision circuit. The mark channel utilizes an identical set of components and has the cathode of tube 86*a* and the anode of tube 86*b* of bi-direction sample gate 86 connected to the output of mark filter 53. A mark storage capacitor 87 has one terminal connected to the anode of tube 86*a*, to the cathode of tube 86*b*, and to the grid of tube 88*a* of voltage comparator 88. The grid potential for both tubes 86*a* and 86*b* of bi-direction gate 86 is supplied by pulses from OR gate 90 which is connected to the output of AND gate 91 and also receives A pulses from program generator 58. The gating voltage for gate 91 is obtained by connecting the anode of tube 75*b* of flip-flop 75 to gate 91 which also receives B pulses from program generator 58.

The output of voltage comparator 88 is taken from the anode of tube 88b and applied to AND gate 89 as one of three inputs therefor. A second gating voltage is taken from the anode of tube 76*b* of flip-flop 76 and applied to gate 89, and C pulses from program generator 58 constitute the third input to gate 89. The output of gate 89 is connected to OR gate 79.

The output pulses from mark and space filters 53 and 54, respectively, are also applied to a residue computer section which stores the value of the mark and space filter outputs for each element and uses this information to indicate possible errors when an even baud decision is made by the logic circuit. A separate storage circuit is connected to each of the outputs of filters 53 and 54. In the mark storage circuit, the anode of diode 95 is connected to the output of mark filter 53, and the cathode of diode 95 is connected to one terminal of capacitor 96, the other terminal of which is connected to ground. The junction between the cathode of diode 95 and capacitor 96 is connected to the anode of tube 101 and to the grid of cathode follower 97. The cathode of cathode follower 97 is connected to AND gate 98 as one of two inputs therefor, the other input being provided by B pulses from program generator 58. A mark storage capacitor 99 has one terminal connected to the output of gate 98 and to the input of AND gate 100. The other terminal of capacitor 99 is connected to ground. Gate 100 has a second input taken from the output of AND gate 103 which has input terminals connected to the anode of tube 75*a*, the anode of tube 76*a*, and a third terminal for receiving C pulses from program generator 58. The output of gate 100 is connected to OR gate 110 which supplies pulses to peak storage capacitor 111, connected to AND gate 112 used merely as a discharge circuit when enabled by character sync E pulses from program generator 58.

In the space storage circuit of the residue computer section, the anode of diode 104 is connected to the output of space filter 54, and the cathode of diode 104 is connected to one terminal of capacitor 105, the other terminal of which is connected to ground. The junction between the cathode of diode 104 and capacitor 105 is connected to the grid of cathode follower 106 and to the anode of tube 113. The cathode of cathode follower 106 is connected to AND gate 107 as one of two inputs therefor, the other input being provided by B pulses from program generator 58. A space storage capacitor 108 has one terminal connected to the output of gate 107 and to the input of AND gate 109. The other terminal of capacitor 108 is connected to ground. The second input for gate 109 is taken from the output of AND gate 77. The output of gate 109 is connected to OR gate 110, the output connections of which have been described above in conjunction with the mark storage circuit of the residue computer. Circuit FIG. 4*a* described thus far constitutes the logic, or decision, portion of storage and logic means 68, while FIG. 4B described below involves the storage and control portion.

A conventional six-stage magnetic shift register 115 comprising stages 115*a* through 115*f* is provided for temporarily storing each sequence of five information elements plus the parity check element constituting each teletype character. The magnetic cores of each stage of shift register 115 have an input winding 116 and a shift winding 117. The cores of stages 115*a* through 115*e* have an advance winding 118, and the cores of stages 115*b* through 115f have an output winding 119. Output pulses from gates 77 and 89 are applied through OR gate 79 of FIG. 4A to input winding 116 of stage 115*a* of FIG. 4B. Each advance winding 118 of stages 115*a* through 115*e* is connected to the input winding 116 of the next succeeding stage in the conventional manner using a diode 120, resistor 121, and capacitor 122. Shift windings 117 of each stage are connected in series with a source of B+ and a driving tube 123. The grid of driving tube 123 is connected to the anode of tube 124*b* of a conventional one-shot multivibrator 124. Multivibrator 124 is triggered by the application of A pulses from program generator 58 to the grid of tube 124*a*. Output windings 119 of stages 115*b* through 115*f* are connected through rectifiers 125 to conventional static flip-flop circuits 126, 127, 128, 129, and 130, respectively. Since the connections to each of flip-flop circuits 126 to 130 are identical, only flip-flop 126 has been shown in detail. One side of winding 119 of stage 115b is connected to the anode of tube 126a through rectifier 125. The other side of winding 119 is connected to ground. In a similar manner winding 119 of stage 115c is connected to the anode of tube 127a of flip-flop 127, and so on with winding 119 of stage 115f being connected through a rectifier 125 to the anode of tube 130a of flip-flop 130. The anode of tube 126b is connected to AND gate 131 to provide a gating voltage therefor. In a similar manner, the anode of tube 127b of flip-flop 127 is connected to AND gate 132 and flip-flops 128 through 130 are connected to AND gates 133 through 135, respectively. After a complete character has been received, a negative character sync pulse E is applied to the grids of tubes 126a, 127a, 128a, 129a, and 130a on line 136 to reset flip-flops 126 through 130 in their space state. Shift register 115 now contains the elements including the parity element; at the next pulse on windings 117 the readings except for parity are transferred to the flip-flops 126 to 130. Subject to correction as described below it may be assumed that these readings are correct. Before the following pulse on windings 117 can alter these readings a reset pulse F from program generator 58 is applied to gates 131 through 135 by means of line 137, by acting as a read pulse. The outputs of gates 131 through 135 are connected to tape puncher 69.

A second magnetic shift register 138 comprising seven stages 138a, 138b, 138c, 138d, 138e, 138f, and 138g is provided for storing the correction information obtained from the residue computer section of the logic circuit and applied to one-shot multivibrator 114. The magnetic cores of each stage of shift register 138 have an input winding 139 and a shift winding 140. The cores of stages 138a through 138f also have an advance winding 141, and the cores of stages 138c through 138g have an output winding 142. The output pulse from one-shot multivibrator 114 is applied to shift register 138 by connecting the anode of tube 114b to one end of input winding 139 of stage 138a. The other end of input winding 139 of stage 138a is connected to ground. Each advance winding 141 of stages 138a through 138f is connected to the input winding 139 of the next succeeding stage in the conventional manner using a diode 143, a resistor 144, and a capacitor 145. Shift winding 140 of stage 138a is connected in series with shift windings 117 of shift register 115. Shift windings 140 of stages 138b through 138g are connected in series with a source of B+ and the anode of a driving tube 146. The grid of driving tube 146 is connected to the anode of tube 147b of a conventional one-shot multivibrator 147. Multivibrator 147 is triggered by pulses passed by OR gate 148, the output of which is connected to the grid of tube 147a. B pulses are supplied to multivibrator 147 from program generator 58 through OR gate 148. Output windings 142 of stages 138c through 138g are connected through rectifiers 149 symmetrically to the cathodes of flip-flop circuits 126, 127, 128, 129, and 130 respectively. The connections between each of the flip-flop circuits and the respective output winding 142 from shift register 138 are the same, so only the connections to flip-flop 126 have been shown in detail. The cathodes of each of tubes 126a and 126b of flip-flop 126 are connected symmetrically to one end of output winding 142 of stage 138c through a rectifier 149. The other end of winding 142 is connected to ground. Similar connections are made between flip-flops 127, 128, 129, and 130 and stages 138d, 138e, 138f, and 138g respectively.

The output of OR gate 79, in addition to being connected to the input of stage 115a of shift register 115, is also symmetrically connected to the grids of tubes 150a and 15b of parity check flip-flop 150. The anode of tube 150b is connected to AND gate 151 and acts as one of two inputs therefor. The other input for gate 151 is supplied in the form of D pulses from program generator 58. The output of gate 151 is connected to the grid of tube 147a of multivibrator 147 through OR gate 148. A negative pulse F from program generator 58 is applied to the grid of tube 150a of flip-flop 150 to reset the flip-flop at the end of each character.

The operation of the receiving and decoding circuit shown in FIGS. 3 and 4 will now be described. For purposes of illustration, assume that a mark followed by a space in the original teletype code is to be transmitted. During the time that this information is to be transmitted, different continuous sequences of random frequency tones are supplied to mark gate 19 and space gate 20 in the transmitter as discussed previously in conjunction with FIG. 1. Since these tones are supplied to mark and space gates 19 and 20, respectively, at a rate which is twice the rate of the binary train containing the original mark and space information, four tones of frequencies $f_1$, $f_2$, $f_3$, and $f_4$ will be supplied in sequence to mark gate 19 simultaneously with a sequence of four tones of frequencies $f_5$, $f_6$, $f_7$, and $f_8$ being applied to space gate 20. For a mark followed by a space in the original code, the sequence of tones transmitted would therefore be $f_1$, $f_2$, $f_7$, and $f_8$ where $f_1$, $f_2$ represent mark and $f_7$, $f_8$ represent space. The discussion of the operation of the circuit of FIG. 1 clearly describes the manner in which this is accomplished.

Tape player 55 plays a magnetic tape which is identical to the one used in tape player 11 of the transmitter and which is played in synchronism with transmitted signal. Sequences of mark and space tones are simultaneously supplied to mixers 60 and 61 respectively. Thus, in the present example, a sequence of tones of frequencies $f_1$, $f_2$, $f_3$ and $f_4$ are supplied to mixer 60 and a sequence of tones of frequencies $f_5$, $f_6$, $f_7$, and $f_8$ are supplied to mixer 61 from tape player 55 in synchronism with the transmitted tone sequences. The mark tones supplied to mixer 60 are heterodyned to an appropriate i.f. frequency by stable fixed-frequency oscillator 62. The output of mixer 60 is filtered by band-pass i.f. filter 64 and is then fed to heterodyning circuit 51. In a similar manner, the space tones supplied to mixer 61 are heterodyned to an appropriate i.f. frequency by stable fixed-frequency oscillator 63. The output of mixer 61 is filtered by band-pass i.f. filter 65 and is then fed to heterodyning circuit 52. The transmitted sequence of tones $f_1$, $f_2$, $f_7$ and $f_8$ is simultaneously supplied by receiver 50 to heterodyning circuits 51 and 52 the outputs of which are selected as the difference-frequencies generated therein. The output of heterodyning circuit 51 is fed to mark filter 53 which will have an output signal only if the received tones and the tones supplied by tape player 55 to mixer 60 are the same. Any other combination of tones will result in an output signal from heterodyning circuit 51 of a frequency which will be blocked by mark filter 53. Similarly, the output of heterodyning circuit 52 is fed to space filter 54 which will have an output signal only if the received tones and the tones supplied by tape player 55 to mixer 61 are the same. Any other combinations of tones will result in an output signal from heterodyning circuit 52 of a frequency which will be blocked by filter 54. The narrow-band frequencies which will be passed by filters 53 and 54 are determined in advance, and the frequencies of oscillators 62 and 63 are then chosen accordingly.

From the discussion in the preceding paragraph it is readily apparent that, in the absence of jamming, mark filter 53 will have an output pulse for each of the periods of time when the tones of frequency $f_1$ and $f_2$ are received and will have no output when the tones $f_7$ and $f_8$ are received and that space filter 54 will not have an output when the tones $f_1$ and $f_2$ are received but will have an output pulse for each of the periods of time when the tones $f_7$ and $f_8$ are received. If the enemy should happen to transmit a tone at the same time a tone of that frequency was being supplied to mixer 60 or 61 from tape player 55, the appropriate filter 53 or 54 would have an output pulse. For example, when the friendly transmitter is transmitting the tone sequence $f_1$, $f_2$, $f_7$ , and $f_8$, tones $f_1$, $f_2$, $f_3$, and $f_4$ are supplied to mixer 60 as previously described. If the enemy should transmit tone $f_3$ at the time tone $f_7$ was transmitted by the friendly transmitter, mark filter 53 would emit an output pulse due to the enemy transmission at the same time as space filter 54 would emit an output pulse due to the friendly transmission. Thus, one of the two bauds comprising the original space element might be considered to be jammed. However, as will be seen in the subsequent description of the storage and logic circuit 68, the correct decision regarding the element will always be made in this situation. If both bauds of a single element are jammed in the manner described above, a correct decision regarding the character will always be made. Only when both bauds of more than one element are jammed will an incorrect character be printed.

Figure 5:
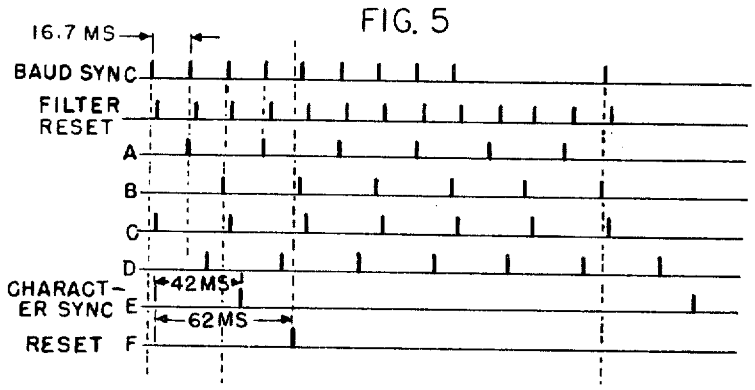
FIG. 5 shows the time relationship of the pulses used in the circuit of FIG. 4.

The operation of the logic and storage circuit 68 shown in detail in FIGS. 4A and 4B will now be described with reference to FIG. 5 which shows the relative times at which the various timing pulses from program generator 58 are supplied to logic and storage circuit 68. The top line FIG. 5 shows the baud synchronization time with each baud having a duration of 16.7 milliseconds. The second line shows the times at which filter reset pulses are supplied to the mark and space filters 53 and 54 respectively. The remainder of the lines FIG. 5 show the timing pulses supplied to storage and logic means 68. Pulse A occurs at the end of the first baud of each element. Pulse B occurs at the end of the second baud of each element. Pulse C occurs 1 millisecond after pulse B. Pulse D occurs approximately 8 milliseconds after pulse A or midway between the first and second bauds of each element. Pulse E occurs once for each character 42 milliseconds after the end of the fifth element. Pulse F occurs once for each character 62 milliseconds after the end of the fifth element which will place it approximately 4 milliseconds after pulse D of the sixth element and approximately four milliseconds prior to the next pulse B. Each of pulses A, B, C, D, E, and F from program generator 58 is approximately 1 millisecond wide.

Three different situations can occur in the reception of a single element comprising two bauds and each of them will be treated separately. These situations are: (1) both bauds received unjammed, (2) one baud jammed, and (3) both bauds jammed. First, consider the operation of the logic circuit of FIG. 4A during normal operation (situation (1) above), i.e., when both bauds comprising an element are received unjammed, and assume, for purposes of illustration, that these bauds represent a mark. The output pulses from mark and space filters 53 and 54 are in the form of direct current pulses of substantially sawtooth waveform having maximum amplitude at the end of each input baud or pulse. Thus when the first mark baud is received, the d-c output pulse from filter 53 is applied to the grid of tube 70*a* of voltage comparator 70. No pulse is applied to the grid of tube 70*b* since space was not transmitted and the output of space filter 54 is zero. As a result tube 70*a* of comparator 70 will conduct and tube 70*b* will be cut off and its plate voltage will be high and this voltage is applied as a gating voltage to AND gate 71. At the end of the first baud, a positive pulse A from program generator 58 is supplied through OR gate 72 to gate 71 which is then enabled and passes a negative pulse to flip-flops 75 and 76 which, prior to transmission, had been set so that tubes 75*a* and 76*a* are non-conducting. The negative pulse from gate 71 is applied to the anode of tube 75*a* and thereby switches flip-flop 75 to its other state in which tube 75*b* is non-conducting. The negative pulse from gate 71 is applied symmetrically to the grids of tubes 76*a* and 76*b* of flip-flop 76 and causes this flip-flop also to switch to its other state in which tube 76*b* is non-conducting. Approximately 1 millisecond after pulse A occurs, a filter reset pulse is applied to filters 53 and 54 and reception of the second baud of the element begins. Since this baud is also a mark, comparator 70 will again supply a high gating voltage to AND gate 71. At the end of this second baud, a positive pulse B from program generator 58 is supplied through OR gate 72 to gate 71 which is again enabled and passes a negative pulse to the anode of tube 75*a* and to the grids of tubes 76*a* and 76*b*. Since this pulse merely serves to lower further the potential at the anode of tube 75*a* and the grid of tube 75*b*, flip-flop 75 will remain in its second state to which it was set by the negative pulse at the end of the first baud and tube 75*b* remains non-conducting. However, flip-flop 76 will switch back to its original state with tube 76*a* non-conducting since this second negative pulse is also applied symmetrically to tubes 76*a* and 76*b* as was the pulse at time A. Thus a single element consisting of two unjammed mark bauds has been received. When this situation occurs, high gating voltages from the anode of tube 75*b* and from the anode of tube 76*a* are applied to AND gate 77. Immediately after pulse B, program generator supplies a positive pulse C to gate 77 which then passes an output pulse through OR gate 79 to winding 116 of stage 115*a* of element storage shift register 115 where it is stored as a mark. At the same time that positive pulse C is applied to gate 77, a negative pulse C is applied to the grids of tubes 75*a* and 76*a* to cut them off and reset flip-flop 75 to its space state and flip-flop 76 to its even state. Since flip-flop 76 was already in its even state this pulse will have no effect upon it. The circuit described thus far is the even baud decision circuit and after pulse C has been applied, this circuit is ready to receive the next two bauds representing the next element. If the transmitted bauds are space instead of mark tube 70*b* of comparator 70 will conduct and the voltage at its anode will be low and will be insufficient gating voltage for AND gate 71. Thus, when pulses A and B are applied to gate 71 through OR gate 72 they will be blocked and no output pulses will be sent to flip-flops 75 and 76 and they will remain in the state to which they were set by the previous C pulse, i.e., tubes 75_a_ and 76_a_ non-conducting. When this occurs, pulse C will not be passed by gate 77 since tube 75_b_ is conducting and its anode voltage, which is applied to gate 77, is low thereby preventing gate 77 from being enabled. From the above discussion it can be seen that a mark is represented by a pulse from gate 77 and that a space is represented by the absence of a pulse.

At the same time that the incoming pulses from mark and space filters 53 and 54 are applied to comparator 70, they are also applied to diodes 95 and 104, respectively, of the residue computer section of the logic circuit and to bi-direction gates 86 and 80, respectively, of the odd baud decision circuit. When an even baud decision such as in the present example is made, the odd baud decision circuit is disabled as will become evident from the discussion in subsequent paragraphs. When unjammed even baud decisions are made the residue computer section of the logic circuit comprising elements 95 through 114 is also disabled as will be more fully explained in the discussion of situation (3) when both bauds of an element are jammed.

Consider now the reception of an element of the type listed in situation (2), i.e., where the second one of the two bauds comprising an element is successfully jammed. Again assume that a mark element is being transmitted but that the enemy has correctly guessed the space tone corresponding to said second baud which, after being heterodyned with the space tone from mixer 61 will energize space filter 53. The first mark, being assumed unjammed, will cause flip-flops 75 and 76 to switch to their second state with tubes 75_b_ and 76_b_ non-conducting in the manner discussed previously for situation (1) above. The output pulse from mark filter 53 is also applied to the anode of tube 86_b_ and the cathode of tube 86_a_ of bi-direction gate 86. At the end of this first baud, pulse A is passed by OR gate 90 and is applied to the grids of tubes 86_a_ and 86_b_ allowing tube 86_b_ to conduct and thereby charge mark storage capacitor 87 to a value equal to the magnitude of the output of mark filter 53. Tube 86_a_ will be held off by the positive pulse at its cathode from filter 53 at time A. At the same time, the output of space filter 54 is applied to the cathode of tube 80_a_ and to the anode of tube 80_b_ of bi-direction gate 80. At the end of this first baud, pulse A is also passed by OR gate 82 to the grids of tubes 80_a_ and 80_b_. However, since the output of space filter 54 is zero at this time, any charge present on space storage capacitor 81 will be discharged through tube 80_a_. Now the second baud of the trasmitted element is applied to the circuit. Since a comparison of the filter outputs is always made in comparator 70, the only way in which the enemy can successfully jam a baud is to transmit at higher power than the friendly transmitter. Therefore, in jamming the second transmitted mark baud of the element, the enemy's space signal as passed by filter 54 is greater in magnitude than the output of mark filter 53. When these signals are simultaneously applied to comparator 70 it attains its space condition with tube 70_b_ conducting thereby presenting a low voltage to gate 71 as discussed previously. Pulse B at the end of this second baud will not be passed by gate 71 and flip-flops 75 and 76 will each remain in their second state to which they were set by the first mark baud. At the same time this takes place, the outputs of mark and space filters are also being applied to bi-direction gates 86 and 80, respectively. At the end of this second baud, pulse B is also applied to AND gates 83 and 91. The gating voltage for gate 83 is taken from the anode of tube 75_a_ and is low since this tube is conducting. As a result pulse B will not be passed by gate 83 and neither tube 80_a_ nor tube 80_b_ will be rendereed conductive. As a consequence space storage capacitor 81 will remain discharged. The gating voltage for gate 91 is taken from the anode of tube 75_b_ and is high since this tube is cut off. Therefore pulse B will be passed by gate 91 through OR gate 90 and will be applied to the grids of tubes 86_a_ and 86_b_. The voltage applied to bi-direction gate 86 will cause mark storage capacitor to remain charged since the second mark output of filter 53 is the same as the first, already stored. The voltage present on mark storage capacitor 87 is applied to the grid of tube 88_a_ of comparator 88, and the voltage present on space storage capacitor 81 is applied to the grid of tube 88_b_. In the present example the voltage applied to the grid of tube 88_a_ is higher than that applied to the grid of tube 88_b_, so tube 88_a_ will conduct and tube 88_b_ will be cut off. The anode voltage of tube 88_b_ is applied to AND gate 89 and this boltage is high since tube 88_b_ is nonconducting. The anode voltage of tube 76_b_ of flip-flop 76 is also applied to gate 89 and is also high since tube 76_b_ is non-conducting. Pulse C is then applied to gates 77 and 89 and will be passed by gate 89 through OR gate 79 to input winding 116 of stage 115_a_ of shift register 115. As previously discussed a pulse from gate 79 represents a mark and the absence of a pulse a space so that the system has made the correct choice for the element in spite of the jamming. Pulse C will not be passed by gate 77 since the anode voltage of tube 76_a_ which is applied to this gate is low. A similar analysis can readily be made for the situation when two space bauds are sent by the friendly transmitter with the second baud being jammed as a mark by the enemy. When this occurs, the anode voltage of tube 88_b_ applied to gate 89 will be low with all other gating voltages applied to gates 77 and 89 being the same as in the case where the second mark is jammed as space. As a result neither gate 77 nor gate 89 will pass pulse C and no pulse will be passed by OR gate 79 to shift register 115. This is the condition necessary to record a space and again the correct decision has been made in spite of the enemy jamming.

A slightly different mode of operation takes place in situation (2) when the first of the two bauds of an element is jammed. Once again assume that the friendly transmitter is sending mark but that the enemy successfully jams the first baud as a space. This will cause comparator 70 to attain its space condition and flip-flops 75 and 76 will remain in their first state to which they were set by the previous negative C pulse with tubes 75_a_ and 76_a_ non-conducting. At the end of the first baud when pulse A is applied to bi-direction gate 80 through OR gate 82 and to bi-direction gate 86 through OR gate 90, mark storage capacitor 87 will be charged to the magnitude of the signal from mark filter 53 and space capacitor 81 will be charged to the higher magnitude of the jamming signal from space filter 54. The second unjammed mark baud is now sent mark filter 53 has an output pulse while the output of space filter 54 is zero. Comparator 70 attains its mark state and when pulse B is applied to gate 71 through OR gate 72, a negative pulse is sent to flip-flops 75 and 76 to switch them to their second state in which tubes 75*b* and 76*b* are non-conducting. At the same time, pulse B is also applied to AND gates 83 and 91. At the same time this occurs flip-flop 75 is still in its first state with tube 75*a* non-conducting and tube 75*b* conducting. As a result, the gating potential applied to gate 83 from the anode of tube 75*a* is high while that applied to gate 91 from the anode of tube 75*b* is low. Pulse B will then be passed by AND gate 83 through OR gate 82 to the grids of tubes 80*a* and 80*b* to allow them to conduct. Since no signal is applied to gate 80 from space filter 54 at this time, space storage capacitor will discharge through tube 80*a*. Mark storage capacitor 87 will retain the charge it received during the first baud since neither tube 86*a* nor 86 *b* is rendered conductive. From this point on the operation of the circuit is the same as it was for the situation when the second of the two bauds of an element was jammed. Capacitor 87 is charged and capacitor 81 is discharged resulting a high gating voltage being applied to gate 89 from the anode of tube 88*b* of comparator 88. Pulse C will be passed by gate 89 through OR gate 79 to shift register to be stored as a mark which is the correct decision. As discussed in the preceding situation with the second of the two bauds jammed, pulse C will not be passed by gate 77.

If the friendly transmitter sends a pair of space bauds, the first of which is jammed a mark, pulse B will be passed by gate 91 and blocked by gate 83 allowing mark storage capacitor 87 to discharge through tube 86*a*. Space storage capacitor will remain charged and comparator 88 will be driven to its space state with the anode voltage of tube 88*b* supplied to gate 89 being low. Pulse C will then be blocked by both gate 77 and gate 89 resulting in no output pulse from OR gate 79 which is the necessary condition for storing a space.

It should be noted that the only time gate 89 can possibly be energized is when one of the two transmitted bauds is successfully jammed which results in an odd baud element, i.e., an element comprising one space and one mark. When this situation occurs, flip-flop 76 is set to its second state with tube 76*b* cut off. Thus, the anode voltage of tube 76*b* is high and is applied to gate 89 as the necessary gating voltage therefor. When two marks or two spaces are received, flip-flop 76 is set to its first state with tube 76*b* conducting. The anode voltage of tube 76*b* is then insufficient to act as a gating voltage on AND gate 89 and pulse C will be blocked by that gate whether or not a high potential from comparator 88 is applied to gate 89.

Consider now situation (3) in which both bauds of an element are jammed. Again assume that mark has been transmitted, but that both mark bauds have been successfully jammed as space. In order to successfully jam the transmitted signal, the enemy must use more power than the friendly transmitter. Voltage comparator 70 will then attain its space condition with tube 70*b* conducting for both bauds. No switching pulses will be applied to flip-flops 75 and 76 and they will remain in their first state to which they were set by the negative pulse C at the end of the previous element with tubes 75*a* and 76*a* non-conducting. Since this state of flip-flop 76 is an even baud state, the odd baud gate 89 will block pulse C as previously discussed. The output pulses from mark and space filters 53 and 54 are also stored in capacitors 96 and 105 respectively. Thus, during the first baud, the output pulse from mark filter 53 passes through diode 95 and charges capacitor 96. At the same time, the output pulse from space filter 54 (energized by the enemy jamming tone) passes through diode 104 and charges capacitor 105. The diodes prevent capacitors 96 and 105 from discharging into bi-direction 80 and 86 at a later time. The output pulses from filters 53 and 54 during the second baud of the element are also applied to capacitors 96 and 105, respectively; and if the magnitude of these pulses is greater than the magnitude of the pulses representing the first baud, the charge on capacitor 96 or 105 to which the pulses are applied will be raised accordingly. The voltage stored by capacitor 96 is applied to the grid of cathode follower 97, the output of which is fed to AND gate 98. The voltage stored by capacitor 105 is applied to the grid of cathode follower 106, the output of which is fed to AND gate 107. At the end of the second baud, pulse B is applied to gates 98 and 107, opening them to allow the output voltage of cathode follower 97 to be stored in mark storage capacitor 99 and the output voltage of cathode follower 106 to be stored in space storage capacitor 108. The voltages stored in capacitors 99 and 108 are directly proportional to the voltages originally stored in capacitors 96 and 105 respectively. For the signals of the present example, mark storage capacitor 99 will store a voltage proportional to the transmitted friendly signal, and space storage capacitor 108 will store a voltage proportional to the enemy jamming signal which is of greater magnitude than the voltage stored by mark storage capacitor 99. The signal present on capacitor 99 is applied to AND gate 100 and the signal present on capacitor 108 is applied to AND gate 109. Pulse C is then applied to AND gates 77 and 103. Since both flip-flops 75 and 76 are in their first state, pulse C will not be passed by gate 77 to gate 109 and therefore gate 109 will remain closed. However, pulse C will be passed by AND gate 103 to gate 100 thereby opening gate 100 to allow a pulse equal in magnitude to the voltage stored on mark storage capacitor 99 to be supplied through OR gate 110 to trigger one-shot multivibrator 114 (FIG. 4B) and to also charge peak storage capacitor 111. Capacitor 111 back biases OR gate 110 and no further pulses will be passed by gate 110 unless they are greater in magnitude than the voltage stored in peak storage capacitor 111.

A positive pulse C is also applied to the grids of tubes 101 and 113 overcoming the negative bias applied to the grids of these tubes and rendering them conductive. Capacitor 96 then discharges through tube 101, capacitor 105 discharges through tube 113 and the system is ready to receive the next element. At the end of each character comprising a total of six elements including the parity check element, a pulse E opens gate 112 and allows peak storage capacitor 111 to discharge.

If a space is transmitted by the friendly transmitter and both bauds are jammed as mark, the operation of the system is essentially the same as for the above situation of mark jammed as space except that gate 103 will not pass pulse C; and, instead, pulse C will be passed by gate 77 to gate 109 to thereby open gate 109 and allow a pulse equal in magnitude to the voltage stored on space storage capacitor 108 to be supplied through OR gate 110 to trigger one-shot multivibrator 114 and to charge peak storage capacitor 111.

After pulse C and prior to the next pulse B, the charge present on capacitors 99 and 108 is allowed to leak off through suitable conventional circuitry, not shown. The parameters of multivibrator 114 are chosen so that the multivibrator will not be triggered unless the pulse applied to the grid of tube 114a from OR gate 110 is equal to or greater in magnitude than a pulse which would occur from sampling the friendly signal. This is necessary to prevent an erroneous correction signal in the event that the enemy transmits at a power lower than that of the friendly transmitter.

It is also evident that neither mark storage capacitor 99 nor space storage capacitor 108 will be sampled when an odd baud decision of the type discussed for situation (2) is made since tube 76*a* of flip-flop 76 will be conducting at the time pulse C is applied to gates 77 and 103. This pulse will be blocked since the voltage applied to gates 77 and 103 from the anode of tube 76*a* is low when tube 76*a* is conducting. Thus, it can be seen that odd baud decisions are final and are not subject to correction.

The operation of the storage circuit shown in FIG. 4B will now be described in conjunction with the information shown in FIG. 5 which shows the relative times at which the pulses referred to occur. Output pulses from OR gate 79 occur at the time of pulse C and are applied to the input winding 116 of stage 115*a* of the character storage shift register 115. As discussed previously, a pulse from gate 79 is stored as a mark and the absence of a pulse from gate 79 will be stored as a space since the core of stage 115a will remain magnetized in the space direction in which it was set by the previous shift pulse on winding 117. Following the C pulses, at which time the information is stored in stage 115*a*, pulse A is applied to one-shot multivibrator 124, the output of which is fed to the grid of driver tube 123 which then supplies a shift pulse to winding 117 of each stage of shift register 115 and to winding 140 of stage 138*a* of shift register 138. This shift pulse magnetizes each stage to the space state. The coupling between stages 115*a* to 115*f* is such that a succeeding stage will then receive an input pulse from a preceding stage only if the preceding stage goes from state mark to state space. This is accomplished by the use of diodes 120, and the manner in which the information is shifted is conventional. When the shift pulse is applied to windings 117, a negative output pulse is applied to the anodes of tubes 126*a*, 127*a*, 128*a*, 129*a*, or 130*a* of flip-flops 126 to 130, respectively, from the output windings 119 of stages 115*b* to 115*f*, respectively, whenever a stage goes from state mark to space. Diodes 125 prevent any pulses from being applied to flip-flops 126 to 130 when stages 115*b* to 115*f* go from stage space to state mark.

After the occurrence of the sixth consecutive pulse C, stages 115*b* through 115*f* will contain the five elements comprising a character while stage 115*a* will contain the parity check element for that character. Following the sixth pulse C and prior to the application of the next pulse A to multivibrator 124, a negative pulse E is applied to the grid of tubes 126*a*, 127*a*, 128*a*, 129*a*, and 130*a* to render each of these tubes non-conducting thereby setting all of flip-flops 126 to 130 to the space state. The next pulse A will then cause the register to shift as before and any stage which stored a mark will send a negative pulse from its output winding 119 to its respective flip-flop in the manner previously discussed to switch the flip-flop to its mark state while there will be no output pulse from stages of shift register 115 storing space and the flip-flops connected to these stages will therefore remain in their space state. Thus, the character is now stored in flip-flops 126 through 130.

The output pulses from OR gate 110 of the residue computer section of the logic circuit are applied to one-shot multivibrator 114 time coincident with the input pulses to character storage shift register 115. An output pulse from multivibrator 114 is stored as a one in stage 138*a* of magnetic shift register 138 which serves as the element correction shift register. An input pulse is received from OR gate 110, coincident with pulse C, only when the residue computer section has determined that the coincident element decision supplied to shift register 115 is more doubtful than any previous element decision of that character. This is accomplished by means of the back biasing action of capacitor 111 on gate 110. Since only one correction pulse, if any, per character is likely to occur this will be corrected, and if the enemy successfully jams both bauds of more than one element an error must be conceded.

Shift winding 140 of stage 138*a* is connected in series with the shift windings 117 of shift register 115 so that pulses A causes the information stored in stage 138*a* to be shifted to stage 138*b*. Pulse B is then applied to one-shot multivibrator 147 through OR gate 148. The output pulse from multivibrator 147 is approximately 15 milliseconds long and is fed to the grid of driver tube 146 which then supplies a shift pulse to winding 140 of stages 138*b* through 138*g* of shift register 138 to set each stage to its zero state. The remainder of the operation of shift register 138 is the same as the operation of shift register 115. Output windings 142 of stages 138*c* through 138*g* apply negative pulses symmetrically to flip-flops 126 through 130, respectively, whenever the stages associated therewith go from one to zero.

Associated with shift register 138 is parity counting flip-flop 150 which is set to its even state with the tube 150*b* conducting prior to receipt of a character. The output pulses, designating marks, from OR gate 79 are applied symmetrically to flip-flop 150 so that it will change its state every time a pulse is received. Thus, when the number of marks in a character is odd, tube 150*b* will be non-conducting and its anode voltage will be high. This voltage is applied to AND gate 151, and if this voltage is high, signifying an odd parity count, pulse D will be passed by gate 151; if this voltage is low, signifying an even parity count, pulse D will be blocked.

Now a brief review of what has taken place during the receipt of a character is in order. As stated previously, after the sixth pulse C, the elements of the character plus the parity element are stored in stages 115*a* through 115*f* of shift register 115. If an element has been successfully jammed, a one is stored in one of stages 138*b* through 138*g* of shift register 138 corresponding to the stage of shift register 115 having the most doubtful element. Approximately 6 milliseconds after the sixth C pulse, pulse E sets flip-flops 126 to 130 to space. Then the next pulse is pulse A which causes the character stored in stages 115*b* to 115*f* to be stored in flip-flops 126 to 130. Approximately 8 milliseconds after this pulse A occurs pulse D is applied to gate 151 and if the parity count is odd, as will be assumed for this case, this pulse will be passed by gate 151 through gate 148 and will trigger multivibrator 147 to thereby cause a shift pulse to be applied to stages 138*b* to 138*g* resulting in an output pulse from the stage storing the one.

This pulse is applied symmetrically to the corresponding flip-flop and changes the state of the flip-flop, i.e., if the flip-flop is in the mark state it will be switched to space, if it is in the space state it will be switched to mark. Only the flip-flop storing the most doubtful element will be changed. The outputs of flip-flops 126 to 130 are fed to AND gates 131 to 135 respectively. Four milliseconds after pulse D a pulse F is applied to gates 131 to 135 and the character is thereby read and is then supplied to tape puncher 69. A negative pulse F is also applied to the grid of tube 150*a* to reset flip-flop 150 to its even state. The next pulse B is then applied 4 milliseconds later but is of no consequence since it is applied to multivibrator 147 during the time that the multivibrator is still in its non-stable state from the application of pulse D. Immediately following this pulse B the next pulse C stores the first element of the next character and the above sequence is repeated.

If the parity count is even, which is the normal condition since an even number of marks were transmitted, flip-flop 150 will be in its even state and pulse D will not be passed by gate 151. As a result, the information, if any, stored in shift register 138 is not applied to flip-flops 126 to 130 before pulse F reads these flip-flops through gates 131 to 135. The next pulse B causes register 138 to shift, and therefore have an output, in its regular sequence which will occur just after pulse F has been applied to gates 131 to 135. The fact that one or more of flip-flops 126 to 130 may be changed by this pulse is of no consequence, since the next pulse E at the end of the next character will reset flip-flops 126 to 130 just prior to the time the desired information from shift registers 115 and 138 is to be stored in them.

In the above system, determination of the location of baud and element errors depends upon the comparison of energized and unenergized filter outputs. If the enemy can jam the transmitted tone, and thus reduce the ability of the receiver to discriminate, the error rate will increase rapidly. On a true average basis, the enemy can only add energy to the transmitted signal, not destroy the energy which the friendly transmitter is providing. However, sufficient phase cancellation might occur occasionally due to the restricted time interval in which the receiver must make a decision. The errors which might result from phase cancellation can be almost completely eliminated with the use of space diversity reception, since the probability that the enemy can create phase cancellation on both antennas simultaneously for a period significant with respect to the baud duration is small. Therefore, it is evident that when the enemy does not succeed in diminishing the received signal, he must necessarily cause it to become larger, and thus works against his own purpose as is evident from the operation of the system. A last deterrent to the enemy is the fact that the power expended against the friendly transmitted tone must come from that otherwise available to fill up the rest of the spectrum.

It has been discovered that the most efficient jamming technique for the enemy is not to place all of his power into one of the possible tones, where his surplus power would be wasted, but rather to spread it over as many tones as he can excite with a power slightly greater than that of the friendly transmitter. This power must be considered at the receiver whose location may not be known to the enemy and whose antenna may be directive to further increase the power required for jamming. In an actual embodiment of the invention, one-hundred sixty-five tones are available to the friendly transmitter, and for a Jamming-to-Signal (J/S) ratio of ten-to-one, the enemy can cover ten tones. The analysis is simpler in this case using the mere ratio than the exponential form db. The overall probability of error can character for the system can then be determined from the following formula:

$$X = 15\left[\frac{J/S}{TW}\right]^4 \qquad (1)$$

where:

X = probability of error per character
J/S = Jamming-to-Signal power ratio
T = the baud duration time in seconds
W = the allowable bandwidth in cycles per second.

The overall probability of error with the system of the invention calculated according to formula (1) shows that the system operates well beneath the design criterion of one error per twenty lines of teletype copy with a J/S ratio of +10db.

If the enemy uses a noise signal instead of jamming with a number of pure sine waves creating a comb power spectrum, it has been found that the probability of error per character is less than that obtained by using the comb signal.

In order to achieve the most accurate operation, the transmitted message could be recorded at the receiver and then played back locally in synchronism with the local random tone key tape, the two outputs heterodyned together, and the product decoded as discussed in conjunction with FIGS. 3 and 4. To obtain accurate synchronization of the local key and the recorded message, a leader of a continuously repeated character should be transmitted at the beginning of each message.

Instead of transmitting each element as a sequence of two bauds in sequence, it is also possible to transmit five information bauds followed by a parity check baud and then repeating the sequence to complete the six elements. This should provide some advantage under conditions of fading and the modifications to be made in the system would be apparent to one skilled in the art.

While the above principles of the invention have been described in connection with specific apparatus, various modifications may be made without departing from the spirit and scope of the invention as set forth in the appended claims.

What is claimed is:

1. A communications system for transmitting teletype information comprising: a magnetic tape player having a multi-channel output, a program generator for developing timing pulses having a plurality of outputs and controlled by one of said output channels of said magnetic tape player in which control information has been pre-recorded, a teletype tape reader controlled by timing pulses from said program generator, a multiple stage shift register connected to the output of said tape reader for temporarily storing data received from said tape reader, said shift register being controlled by timing pulses from said program generator to commutate said data into binary code trains of time-sequential pulses, a parity counting circuit for receiving said time-sequential pulse trains and adding an appropriate parity checking pulse to each of said trains, a switch modulator having first and second outputs controlled by said time-sequential pulses and said parity checking pulses, first and second gates connected to first and second tone channels, respectively, of said magnetic tape player, said first and second gates being enabled by said first and second outputs, respectively, of said switch modulator, the tones passed by one of said gates being chosen to represent a mark and the tones passed by the other of said gates being chosen to represent a space in said binary code to thereby represent said train of pulses as a sequence of tones, and means for transmitting said sequence of tones.

2. A communications system as set forth in claim 1 wherein said first and second tone channels supply random tone sequences to said gates at a rate which is two times the rate at which said binary pulses are fed to said switch modulator.

3. A communications system according to claim 2 wherein means are provided for receiving and decoding said transmitted sequence of tones to reproduce said teletype information.

4. A receiver for decoding, in the presence of enemy jamming, radioteletype information transmitted as a two-valued code train of sequential bauds each represented by a random tone chosen according to a predetermined code wherein two successive bauds comprise element and a predetermined number of said elements comprise a character plus a parity check element for said character, said receiver comprising: tone generating means having a pair of outputs each corresponding to a different value of said two-valued code, said tone generating means supplying predetermined random tones to each of said outputs in accordance with and in synchronism with said transmitted predetermined code; means for heterodyning each of said outputs of said tone generating means with the received signal; a pair of pulsed narrow band filters connected to said heterodyning means, one of said filters being adapted to pass a signal representing one value of said two-valued code and the other of said filters being adapted to pass a signal representing the other value of said two-valued code whereby said filters have an output only when said input tones and said generated tones bear a relationship established by said predetermined code; odd baud decision means connected to the outputs of said filters for comparing the magnitudes of the signals representing two successive bauds comprising an element when one of said two successive bauds is jammed and said bauds disagree to thereby determine the correct value for said element; even baud decision means also connected to the outputs of said filters for determining the value of an element when said two successive bauds comprising the element are the same; storage means connected to the outputs of said odd baud decision circuit and said even baud decision circuit for storing said predetermined number of elements comprising said character; residue computer means connected to the output of said filter means and to said even baud decision means for determining which element, if any, supplied by said even baud decision means to said storage means is most likely to be in error; parity checking means connected to said storage means; and correction means connected to said residue computer means and said parity checking means for correcting said element most likely to be in error when the parity check on said character fails.

5. A receiver for decoding information transmitted as one of each of a plurality of mutually exclusive pairs of signals, each pair identifying an element, a predetermined number of said elements identifying a character, and an additional character element identifying only the parity of said other elements, subject to interference at times introducing the excluded signal, said receiver comprising:

first difference detector means responsive to the dominant one of said signals of each of said pairs as received, second detector means responsive to the non-dominant one of said siginals for one element, third means responsive to proper parity of the outputs from said first detector to store such outputs and responsive to improper parity of the outputs to store instead a corrected element as determined from the outputs of said second detector means, whereby in spite of such interference by energy in excess of the transmitted signals the proper elements corresponding to the transmitted signals may be stored and the interference excluded.

6. A receiver for decoding information transmitted as one of each of a plurality of mutually exclusive pairs of signals, each pair identifying an element, a predetermined number of said elements identifying a character, and a like number of additional character elements identifying only the parity of corresponding ones of said first number of elements, subject to interference at times introducing the excluded signal, said receiver comprising:

first difference detector means responsive to the dominant one of said signals of each of said pairs as received, second difference detector means responsive to the non-dominant ones of said pair for said first number of elements and the corresponding additional elements, third means responsive to proper parity of the outputs from said first detector to store such outputs and responsive to improper parity of the outputs to store instead the outputs of said second detector means, whereby in spite of such interference by energy in excess of the transmitted signals for any of the first number of elements or the corresponding ones of the additional elements the proper elements corresponding to the transmitted signals may be stored and the interference excluded.

7. A receiver for decoding radio teletype information transmitted as a signal consisting of a plurality of sequential bauds each represented by one of two mutually exclusive random tones chosen according to a predetermined code to identify one of two element values, wherein a plurality of successive bauds comprise an element, bauds of each said element identify like values, and a predetermined number of said elements comprise a character, subject to occasional interference at the receiver by energy corresponding to the excluded tone and exceeding double the amplitude of the transmitted tone, such that the received signal does not correspond to the transmitted signal, said receiver comprising: filter means controlled according to said predetermined code to pass each of such random tones of the actual signal received only at times established by said code in synchronism with said transmitted signal; first difference detector means responsive to the dominant one of said random tones received to identify one of said element values for each baud, second difference detector means responsive to the larger of the non-dominant tones received to identify one of said element values for the successive bauds of one element, means responsive to like identified values from both baud outputs for one element from said first detector means to store such value and responsive to unlike identified values from both baud outputs to store instead the value identified by said second detector means, whereby in spite of interference by energy corresponding to the excluded tone substantially in excess of the transmitted tone for one baud of each of one or more elements the proper element values corresponding to the transmitted tones may be stored.

8. A receiver as in claim 7 in which one of the elements of a character is used to provide parity for the character including further means responsive to said like value dominants baud outputs and to substantial non-dominant tones to store element correction pulses, and means responsive to improper character parity to use such correction pulses to correct the corresponding elements stored from said first detector whereby in case of additional interference for the other baud of one element of a character the proper elements and character may still be stored.

9. A receiver for decoding information transmitted as one of each of a plurality of mutually exclusive pairs of signals, each pair identifying an element, a predetermined number of said elements identifying a character, a like number of additional character elements identifying only the parity of corresponding ones of said first number of elements, and one of each of said first number of elements and the corresponding additional elements identifying only the parity of the other elements of the character, subject to interference at times introducing the excluded signal, said receiver comprising:

first difference detector means responsive to the dominant one of said pairs as received, second difference detector means responsive to the non-dominant ones of said pair for said first number of elements and the corresponding additional elements, third means responsive to proper output from said first detector to store such output and responsive to improper parity output to store instead the output of said second detector means, fourth means responsive to improper character parity output from said first detector to correct the outputs stored by said third means responsive to proper element parity output from said first detector, whereby in spite of such interference for both the first number of elements and the corresponding one of the additional elements for only one element of a character the proper elements may be stored and the interference excluded.

* * * * *